United States Patent
Eom et al.

(10) Patent No.: US 11,048,529 B2
(45) Date of Patent: Jun. 29, 2021

(54) METHOD FOR USER BASED APPLICATION GROUPING UNDER MULTI-USER ENVIRONMENT AND TABLE TOP DISPLAY APPARATUS FOR PERFORMING THE SAME

(71) Applicant: Research & Business Foundation Sungkyunkwan University, Suwon-si (KR)

(72) Inventors: Young Ik Eom, Seoul (KR); Jong Gyu Park, Suwon-si (KR); In Hyeok Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/188,844

(22) Filed: Nov. 13, 2018

(65) Prior Publication Data

US 2019/0155623 A1    May 23, 2019

(30) Foreign Application Priority Data

Nov. 23, 2017    (KR) .................. 10-2017-0157485

(51) Int. Cl.
*G06F 3/048*    (2013.01)
*G06F 9/451*    (2018.01)
(Continued)

(52) U.S. Cl.
CPC ............ *G06F 9/451* (2018.02); *G06F 3/0484* (2013.01); *G06F 3/04817* (2013.01); *G06K 9/52* (2013.01);
(Continued)

(58) Field of Classification Search
CPC ...... G06F 3/048; G06F 9/451; G06F 3/04817; G06F 3/0484; G06F 3/0488;
(Continued)

(56) References Cited

U.S. PATENT DOCUMENTS 8,001,613 B2   8/2011 Duncan
8,010,466 B2 *  8/2011 Patinkin .................. H04L 51/12
                                                706/12
(Continued)

FOREIGN PATENT DOCUMENTS

KR   10-2009-0036877 A    4/2009
KR   10-2010-0132174 A   12/2010

OTHER PUBLICATIONS

Park, J. et al., "Grouping Applications Using Geometrical Information of Applications on Tabletop Systems", *Proceedings of the 30th Annual ACM Symposium on User Interface Software and Technology*, Oct. 2017 (5 pages in English).

*Primary Examiner* — Mahelet Shiberou
(74) *Attorney, Agent, or Firm* — NSIP Law (57) ABSTRACT

A method for user-based application grouping in a table-top multi-user environment where a plurality of users execute applications individually comprises collecting geometric information of each window of a plurality of applications displayed on a table-top display—each window of the plurality of applications has different geometric information according to the position at which each user uses the table-top display; and processing geometric information of each window of the plurality of applications through a clustering algorithm processing unit by using the collected geometric information as a criterion for classifying the plurality of applications and grouping the processed geometric information for each user. Through grouping of applications currently executed in a table-top environment for each user, a user-specific special function such as a user-specific application history may be provided.

23 Claims, 7 Drawing Sheets

1) $(x_1, y_1)$: Coordinate at the upper-left position of the bounding box(320a)

2) $(x_2, y_2)$: Coordinate at the lower-right position of the bounding box (320b)

3) Rotation angle (340)

(51) Int. Cl.
  *G06K 9/62* (2006.01)
  *G06F 3/0481* (2013.01)
  *G06F 3/0484* (2013.01)
  *G06K 9/52* (2006.01)

(52) U.S. Cl.
  CPC .. *G06K 9/6223* (2013.01); *G06F 2203/04803* (2013.01)

(58) Field of Classification Search
  CPC .. G06F 3/04842; G06F 3/04883; G06F 3/041; G06F 3/0481; G06K 9/52; G06K 9/6223
  See application file for complete search history.

(56) References Cited

U.S. PATENT DOCUMENTS

| | | | | |
|---|---|---|---|---|
| 8,402,382 B2* | 3/2013 | Agarawala | | G06F 3/0483 345/173 |
| 9,069,577 B2* | 6/2015 | Goossens | | G06F 3/0483 |
| 2008/0005693 A1* | 1/2008 | Oliver | | G06F 3/04845 715/781 |
| 2008/0034317 A1* | 2/2008 | Fard | | G06F 3/04845 715/781 |
| 2008/0192059 A1* | 8/2008 | Kennedy | | G06F 3/0488 345/537 |
| 2009/0100343 A1 | 4/2009 | Lee et al. | | |
| 2010/0174732 A1* | 7/2010 | Levy | | G06F 40/10 707/768 |
| 2010/0333013 A1* | 12/2010 | Ouchia | | G06F 3/0481 715/781 |
| 2011/0134047 A1* | 6/2011 | Wigdor | | G06F 3/04883 345/173 |
| 2012/0096390 A1 | 4/2012 | Kwahk et al. | | |
| 2012/0096392 A1* | 4/2012 | Ording | | G06F 9/451 715/783 |
| 2012/0304229 A1* | 11/2012 | Choi | | H04N 21/8173 725/41 |
| 2013/0069860 A1* | 3/2013 | Davidson | | G06F 3/0488 345/156 |
| 2013/0093708 A1* | 4/2013 | Annett | | G06F 3/0425 345/173 |
| 2013/0191753 A1* | 7/2013 | Sugiyama | | G06F 3/165 715/727 |
| 2014/0085210 A1* | 3/2014 | Avrahami | | G06F 16/4393 345/173 |
| 2018/0268601 A1* | 9/2018 | Rad | | G06K 9/00208 |
| 2018/0374225 A1* | 12/2018 | Edge | | G06T 7/33 |

* cited by examiner

METHOD FOR USER BASED APPLICATION GROUPING UNDER MULTI-USER ENVIRONMENT AND TABLE TOP DISPLAY APPARATUS FOR PERFORMING THE SAME

CROSS-REFERENCE TO RELATED APPLICATIONS

This application claims priority to Korean Patent Applications No. 10-2017-0157485 filed on Nov. 23, 2017 in Korea, the entire contents of which are hereby incorporated by reference in their entirety.

BACKGROUND OF THE INVENTION

Field of the Invention

The present invention relates to an application management technology and, more particularly, to methods for managing a plurality of multi-user environment-based applications.

Related Art

Recently, there is a growing interest in computing environments providing user experience. Along with the advancement of touch-based digital technology, table-top computers have been spread rapidly. The widespread use of touch-based table computing environments has brought a few notable advantages to the user interface.

The first advantage is that the way people use computers has been changed from the vertical to the horizontal computing environment. The shift from the vertical computing environment such as the desktop computing environment to the touch-based horizontal computing environment has changed the way users interact with computers and how the computers are used.

The second advantage is that input and output devices are getting more attention in the integrated horizontal computing environment. The interaction method based on mice or keyboards in the past has been changed to a direct touch method on the display. Combination of input and output functionalities on a touch screen facilitates coupling of model-control-representation which plays an important role in the user interface.

The third advantage is that a new search for utilization of augmented reality-based interaction space is being made, where the digital world provided by the table-top computing and the real world are integrated. In the horizontal computing environment, the space over the screen and the space on which objects of the real world are placed may be easily combined together.

However, prior art related to the table-top computing has focused on connecting a touch input to the user who has entered the touch input. The prior art has a drawback that applications may not be grouped for each user. Also, since the prior art related to the table-top computing mostly focuses on a single user system such as a smartphone or a desktop computer, it is difficult to provide a technology for grouping applications for each user in a multi-user environment such as the table-top environment.

PATENT LITERATURE (Patent Literature 1) Korean Publication Application Number 10-2009-0036877 (METHOD AND SYSTEM FOR MANAGING OBJECTS IN MULTIPLE PROJECTION WINDOWS ENVIRONMENT, BASED ON STANDARD RULER, Samsung Electronics, Co., Ltd.)

(Patent Literature 2) U.S. Pat. No. 8,001,613 (Security using physical objects, Microsoft Corporation)

SUMMARY

To solve the problem above, Some example embodiments of the present invention provide a special function for each user in an environment where multi-users execute applications individually, such as the table-top computing environment, or to identify and manage applications used by each user to manage user-specific resources.

According to some example embodiments of the present invention to solve the problem above, a method for user-based application grouping in a table-top multi-user environment where a plurality of users execute applications individually comprises collecting geometric information of each window of a plurality of applications displayed on a table-top display—each window of the plurality of applications has different geometric information according to the position at which each user uses the table-top display; and processing geometric information of each window of the plurality of applications through a clustering algorithm processing unit by using the collected geometric information as a criterion for classifying the plurality of applications and classifying the plurality of applications for each user. The collecting geometric information of each window of a plurality of applications displayed on a table-top display may comprise collecting geometric information including a first and a second coordinates located at both endpoints of an imaginary diagonal line of a bounding box enclosing each window of the plurality of applications, where the first coordinate is located at a first endpoint of the imaginary diagonal line of the bounding box of each application, and the second coordinate is located at a second endpoint opposite the first endpoint of the imaginary diagonal line of the bounding box, and a rotation angle representing an angle at which the corresponding application window is inclined with respect to the imaginary reference line of the bounding box. The clustering algorithm processing unit may receive geometric information including the first and the second coordinates located at both endpoints of the imaginary diagonal line of each bounding box of the plurality of applications and the rotation angle representing an angle at which each application window is inclined with respect to the imaginary reference line of the bounding box, analyze the pattern of the geometric information according to the characteristics of the position at which each user uses the table-top display by using K-Nearest Neighbor (K-NN) classifier machine learning algorithm, and classify the plurality of applications for each user. The method for user-based application grouping may further comprise showing a history of a plurality of applications classified for each user, the history including a list of at least one recently executed applications for each user. The user-based application grouping method may manage a system resource by using a plurality of applications classified for each user, the system resource corresponding to at least one of a central processing unit (CPU), memory, and input/output system. The collecting geometric information of each window of a plurality of applications displayed on a table-top display may be performed by a geometric information collecting unit, and the geometric information collecting unit may perform at least one of functions for generating and deleting each window of the plurality of applications and for updating status information. The geometric information collecting unit may include a window manager which is system software managing positions and shapes of windows of applications or programs in a GUI system.

According to other example embodiments of the present invention to solve the problem above, a table-top display apparatus performing a method for user-based application grouping in a table-top multi-user environment where a plurality of users execute applications individually comprises a geometric information collecting unit collecting geometric information of each window of a plurality of applications displayed on a table-top display, each window of the plurality of applications having different geometric information according to the position at which each user uses the table-top display; and a clustering algorithm processing unit using the collected geometric information as a criterion for classifying the plurality of applications and classifying geometric information of each window of the plurality of applications for each user by applying a clustering algorithm. The geometric information collecting unit may collect geometric information including a first and a second coordinates located at both endpoints of an imaginary diagonal line of a bounding box enclosing each window of the plurality of applications, where the first coordinate is located at a first endpoint of the imaginary diagonal line of the bounding box of each application, and the second coordinate is located at a second endpoint opposite the first endpoint of the imaginary diagonal line of the bounding box, and a rotation angle representing an angle at which the corresponding application window is inclined with respect to the imaginary reference line of the bounding box. The clustering algorithm processing unit may receive geometric information including the first and the second coordinates located at both endpoints of the imaginary diagonal line of each bounding box of the plurality of applications and the rotation angle representing an angle at which each application window is inclined with respect to the imaginary reference line of the bounding box, analyze the pattern of the geometric information according to the characteristics of the position at which each user uses the table-top display by using K-Nearest Neighbor (K-NN) classifier machine learning algorithm, and classify the plurality of applications for each user. The apparatus performing a method for user-based application grouping in a multi-user environment may show a history of a plurality of applications classified for each user, the history including a list of at least one recently executed applications for each user.

According to still other example embodiments of the present invention to solve the problem above, a method for user-based application grouping in a multi-user environment comprises collecting geometric information of each of a plurality of displayed applications, each of the plurality of applications having different geometric information for each user; and using collected geometric information of each of the plurality of applications as a criterion for classifying the plurality of applications and classifying the plurality of applications for each user by using a clustering algorithm. Each window of the plurality of applications may have different geometric information according to the position at which each user uses the table-top display. The collecting geometric information of each window of a plurality of displayed applications may comprise collecting geometric information including a first and a second coordinates located at both endpoints of an imaginary diagonal line of a bounding box enclosing each window of the plurality of applications, where the first coordinate is located at a first endpoint of the imaginary diagonal line of the bounding box of each application, and the second coordinate is located at a second endpoint opposite the first endpoint of the imaginary diagonal line of the bounding box, and a rotation angle representing an angle at which the corresponding application windows is inclined with respect to the imaginary reference line of the bounding box. The using collected geometric information of each of the plurality of applications as a criterion for classifying the plurality of applications and classifying the plurality of applications for each user by using a clustering algorithm may receive geometric information including the first and the second coordinates located at both endpoints of the imaginary diagonal line of each bounding box of the plurality of applications and the rotation angle representing an angle at which each application window is inclined with respect to the imaginary reference line of the bounding box, analyze the pattern of the geometric information according to the characteristics of the position at which each user uses the table-top display by using K-Nearest Neighbor (K-NN) classifier machine learning algorithm, and classify the plurality of applications for each user. The method for user-based application grouping may further comprise showing a history of a plurality of applications classified for each user, the history including a list of at least one recently executed applications for each user.

According to still other example embodiments of the present invention to solve the problem above, a method for user-based object grouping in an augmented reality multi-user environment may comprise collecting geometric information of each of a plurality of displayed objects, each of the plurality of objects having different geometric information for each user; and using collected geometric information of each of the plurality of collected objects as a criterion for classifying the plurality of objects and classifying the plurality of objects for each user by using a clustering algorithm. The collecting geometric information of each of a plurality of displayed objects may comprise collecting geometric information including a first and a second coordinates located at both endpoints of an imaginary diagonal line of a bounding box enclosing each of the plurality of objects, where the first coordinate is located at a first endpoint of the imaginary diagonal line of the bounding box of each object, and the second coordinate is located at a second endpoint opposite the first endpoint of the imaginary diagonal line of the bounding box, a rotation angle representing an angle at which the corresponding object is inclined with respect to the imaginary reference line of the bounding box, and depth information of the object. The using collected geometric information of each of the plurality of objects as a criterion for classifying the plurality of objects and classifying the plurality of objects for each user by using a clustering algorithm may receive geometric information including the first and the second coordinates located at both endpoints of the imaginary diagonal line of each bounding box of the plurality of objects, the rotation angle representing an angle at which each object is inclined with respect to the imaginary reference line of the bounding box, and depth information of the object; analyze the pattern of the geometric information according to the characteristics of each user by using K-Nearest Neighbor (K-NN) classifier machine learning algorithm; and classify the plurality of objects for each user. The collecting geometric information of each of a plurality of displayed objects may comprise modeling each object visually appearing as two-dimensional projections into a three-dimensional model for each of the plurality of objects and generating a three-dimensional bounding box enclosing the three-dimensional model; and collecting geometric information including geometric information of angle and depth of the three-dimensional bounding box generated— the angle represents an angle at which the corresponding object is inclined with reference to an imaginary reference line of the bounding box, and the depth represents the depth of the corresponding object.

DESCRIPTION OF EXEMPLARY EMBODIMENTS

Figure 1:
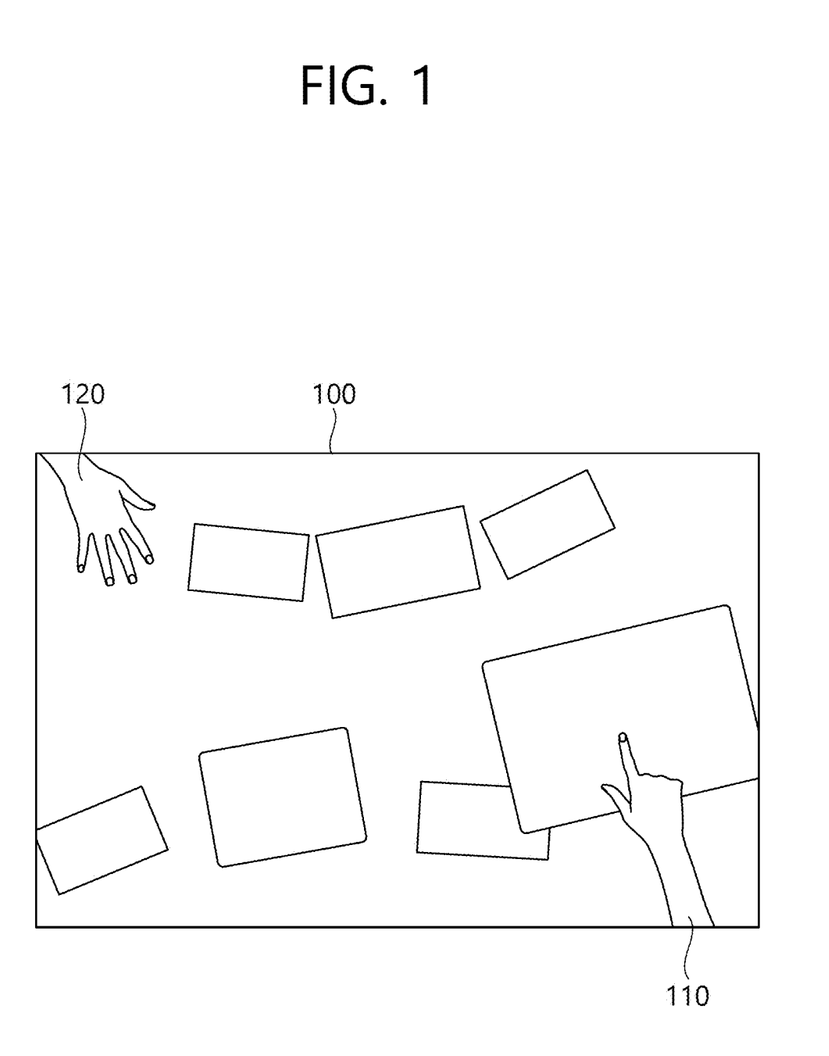
FIG. 1 illustrates a method for user-based application grouping in a multi-user environment according to a preferred embodiment of the present invention.

FIG. 1 illustrates a method for user-based application grouping in a multi-user environment according to a preferred embodiment of the present invention.

Referring to FIG. 1, a first user 110 activates or executes a plurality of applications within a predetermined radius from the position of the first user 110 on a table-top multi-user environment display 100. Also, a second user 120 activates or executes a plurality of applications within a predetermined radius from the position of the second user 120 on a table-top multi-user environment display 100.

FIG. 1 illustrates a case in which two users perform a collaborative work by operating a plurality of applications on a table-top display 100. For example, the first user 110 operates an application at an upper position when viewed with respect to the up, down, left, and right of the table-top display 100, and the second user 120 operates an application at a lower position of the table-top display.

Since each user operates a plurality of applications at different positions of the up, down, left, and right side of the table-top display 100 in a table-top display environment, applications operated by one particular user exhibit common geometric features distinguished from the applications operated by other users. For example, the position of an application window is located within a predetermined radius from the corresponding user, or the rotation angle of the application window lies within a specific angular range with respect to the user. In the embodiments of the present invention, applications may be grouped for each user by using geometric information thereof.

For example, the window manager of the Linux operating system manages geometric information (X, Y coordinates, rotation angle, and the like of an application window on the table-top display) of windows of currently running applications. Therefore, embodiments of the present invention may collect geometric information of each application at the window manager level of the Linux operating system.

Although FIG. 1 illustrates the case of two users, the present invention may also be applied to the case in which four users perform a collaborative work by operating a plurality of applications on the table-top display 100; and in this case, when viewed from the up, down, left, and right side of the table-top display 100, individual users may perform the collaborative work by operating a plurality of their own applications in the upper, lower, left, and right part of the table-top display 100. A method for user-based application grouping in a multi-user environment according to the embodiments of the present invention may be applied to a table-top display environment. In other words, in the table-top display environment, a collaborative work may be performed among a plurality of users through an interface. Users in the collaborative workspace may apply a touch input to the table-top display, thereby running, operating, or controlling a plurality of applications.

Being a technology which may be applied to a multi-user environment in which a collaborative work is performed in a table-top display environment, a method for multi-user based application grouping according to the embodiments of the present invention may provide a user-specific special function—for example, an application history providing function which displays a list of applications recently executed by each user or a function for managing a system resource corresponding to at least one of the CPU, memory, and I/O system by using a plurality of applications classified for each user—reliably by grouping applications for the user.

A method for multi-user based application grouping according to the embodiments of the present invention is not limited to a table-top display environment but may also be applied to the case where a plurality of users operate a plurality of applications on a display in a multi-user environment in addition to the table-top display. Or a method for multi-user based application grouping according to the embodiments of the present invention may be applied to an augmented reality based multi-user environment—for example, in the environment where a plurality of users operate a plurality of applications or perform a task by using a 3D virtual object based on the augmented reality technology of Microsoft HoLoLens, by grouping applications for each user or grouping virtual objects related to the corresponding user.

Figure 2:
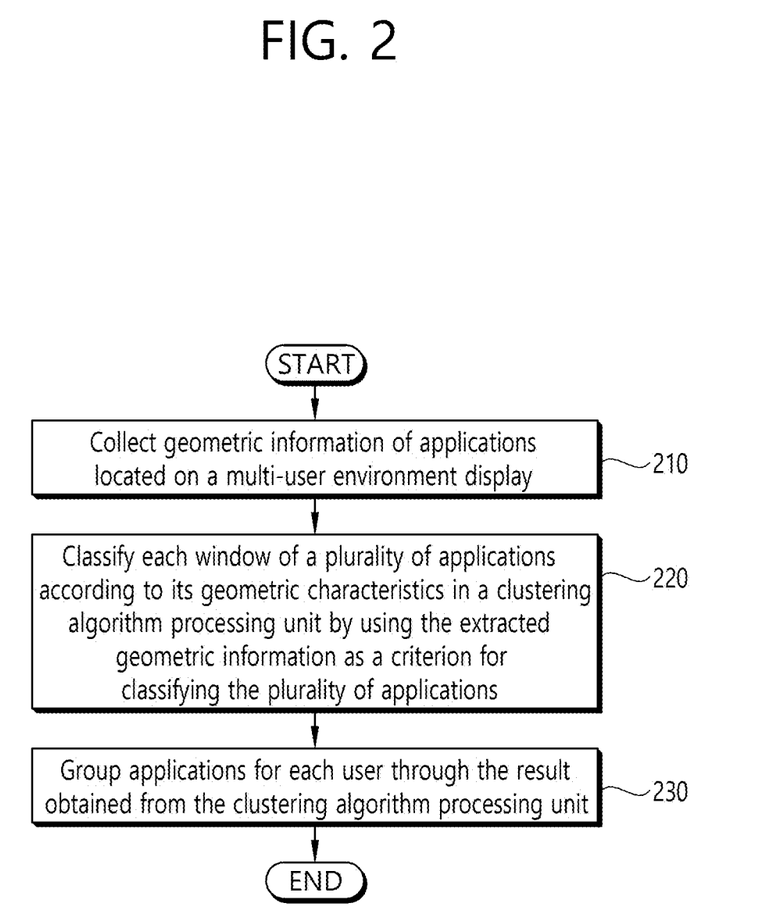
FIG. 2 is a flow diagram illustrating a process for user-based application grouping in a multi-user environment according to a preferred embodiment of the present invention.

FIG. 2 is a flow diagram illustrating a process for user-based application grouping in a multi-user environment according to a preferred embodiment of the present invention.

Referring to FIG. 2, a process for user-based application grouping in a multi-user environment according to a preferred embodiment of the present invention first collects geometric information of each of a plurality of applications located on a multi-user environment display (step 210). The collecting geometric information of each of a plurality of applications, to take a table-top environment as an example, may collect geometric information including a first and a second coordinates located at both endpoints of an imaginary diagonal line of a virtual bounding box enclosing each window of a plurality of applications—where the first coordinate is located at a first endpoint of the imaginary diagonal line of the bounding box of each application, and the second coordinate is located at a second endpoint opposite the first endpoint of the imaginary diagonal line of the bounding box—and a rotation angle representing an angle at which the corresponding application window is inclined with respect to the imaginary reference line of the bounding box. Detailed descriptions thereof will be given later with reference to FIG. 3.

The clustering algorithm processing unit (424 of FIG. 4) to be described later classifies each window of the plurality of applications according to its geometric characteristics by using the geometric information extracted through the collection as a criterion for classifying the plurality of applications (step 220). The clustering algorithm processing unit (424 of FIG. 4), to take the table-top display environment as an example, may receive geometric information including the first and the second coordinates located at both endpoints of the imaginary diagonal line of a virtual bounding box of each of the plurality of applications and the rotation angle representing an angle at which the corresponding application window is inclined with respect to the imaginary reference line of the bounding box, analyze the pattern of the geometric information according to the characteristics of the position at which each user uses the table-top display by using the K-Nearest Neighbor (K-NN) classifier machine learning algorithm, and classify the plurality of applications for each user.

Applications are grouped for each user through the result obtained from the clustering algorithm processing unit (step 230).

Figure 3:
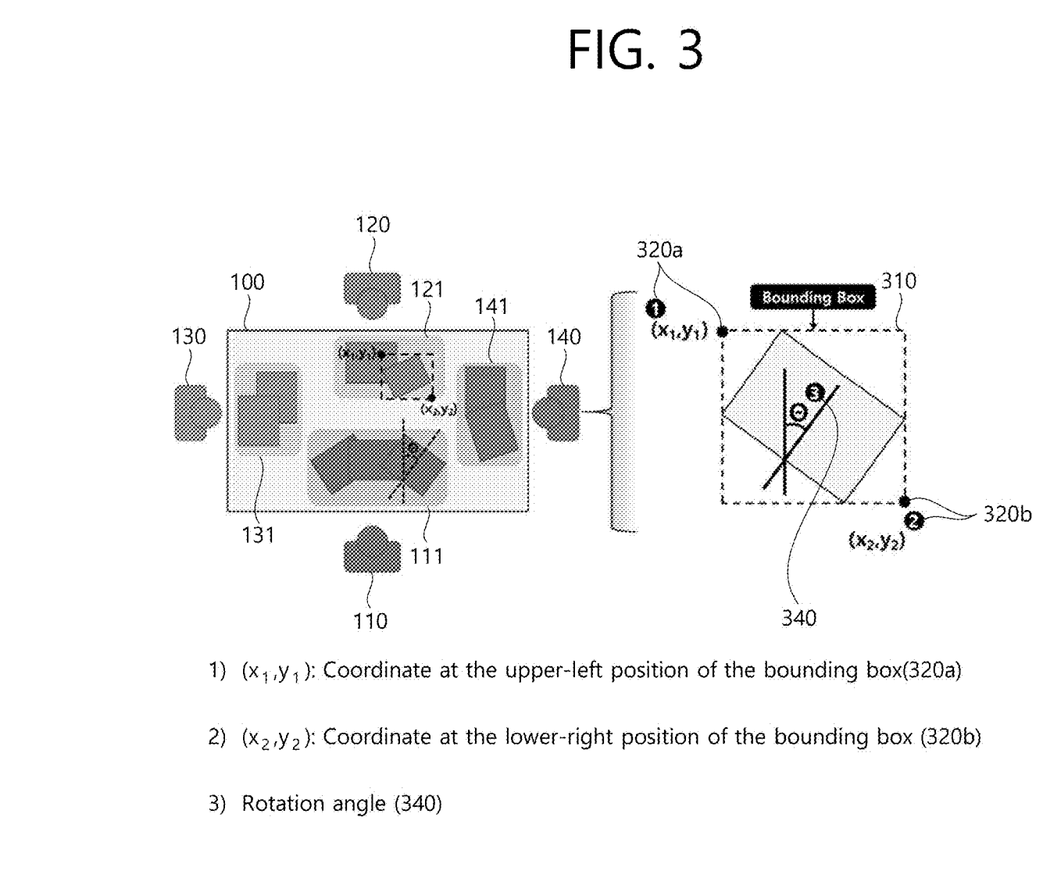
FIG. 3 illustrates a process for collecting geometric information of each of a plurality of applications displayed on a table-top display in a multi-user environment according to a preferred embodiment of the present invention.

FIG. 3 illustrates a process for collecting geometric information of each of a plurality of applications displayed on a table-top display in a multi-user environment according to a preferred embodiment of the present invention.

Referring to FIG. 3, the collecting geometric information of each of a plurality of applications in a multi-user environment according to a preferred embodiment of the present invention, when the multi-user environment is a two-dimensional environment based on a table-top display, collects a first coordinate 320*a* (x1, y1) and a second coordinate 320*b* (x2, y2) corresponding to both endpoints of an imaginary diagonal line of a virtual bounding box 310 enclosing each window of a plurality of applications and a rotation angle 340. The bounding box 310 is a rectangle formed by connecting a virtual line enclosing each application window, and when each application window is inclined with a predetermined angle, the bounding box represents a rectangle formed by connecting virtual lines extending from both endpoints of the diagonal line of the application window. The coordinates 320*a*, 320*b* of both endpoints of the imaginary diagonal line of the bounding box 310 include, for example, the first coordinate (x1, y1) 320*a* at the upper-left position of the bounding box 310 and the second coordinate (x2, y2) 320*b* at the lower-right position of the bounding box 310. Or the coordinates of both endpoints of the imaginary diagonal line of the bounding box 310 may include the coordinate at the upper-right position of the bounding box 310 and the coordinate at the lower-left position of the bounding box 310. The rotation angle 340 may represent the angle at which the corresponding application window is inclined with respect to a virtual reference line (vertical line) of the bounding box 310.

In the method for multi-user based application grouping according to a preferred embodiment of the present invention, since each user executes the plurality of applications at each different position, the plurality of applications used by the same user have similar geometric information.

In other words, for example, both endpoints of a diagonal line consisting of the coordinate (x1, y2) 320*a* at the upper-left position and the coordinate (x2, y2) 320*b* at the lower-right position of a bounding box 310 of a plurality of applications 111 used by a first user 110 and the rotation angle 340 of the bounding box 310 may show a predetermined first pattern having a value within a predetermined range; and both endpoints of a diagonal line consisting of the coordinate (x1, y2) 320*a* at the upper-left position and the coordinate (x2, y2) 320*b* at the lower-right position of a bounding box 310 of a plurality of applications 121 used by a second user 120 and the rotation angle 340 of the bounding box 310 may show a predetermined second pattern having a value within a predetermined range.

Also, both endpoints of a diagonal line consisting of the coordinate (x1, y2) 320*a* at the upper-left position and the coordinate (x2, y2) 320*b* at the lower-right position of a bounding box 310 of a plurality of applications 121 used by a third user 130 and the rotation angle 340 of the bounding box 310 may show a predetermined third pattern having a value within a predetermined range. In the same way, both endpoints of a diagonal line consisting of the coordinate (x1, y2) 320*a* at the upper-left position and the coordinate (x2, y2) 320*b* at the lower-right position of a bounding box 310 of a plurality of applications 141 used by a fourth user 140 and the rotation angle 340 of the bounding box 310 may show a predetermined fourth pattern having a value within a predetermined range.

In other words, since the range of both endpoints of a diagonal line consisting of the coordinate (x1, y1) 320*a* at the upper-left position and the coordinate (x2, y2) 320*b* at the lower-right position of the bounding box 310 of the applications used by each user and the rotation angle 340 of the bounding box 310 is similar to the range of both endpoints and a rotation angle of another bounding box for a different user, by using a method for multi-user based application grouping according to a preferred embodiment of the present invention, geometric information of each window of a plurality of applications may be collected, a clustering algorithm may be applied to the collected geometric information, and thereby a plurality of applications executed by each user may be grouped for the corresponding user.

Figure 4:
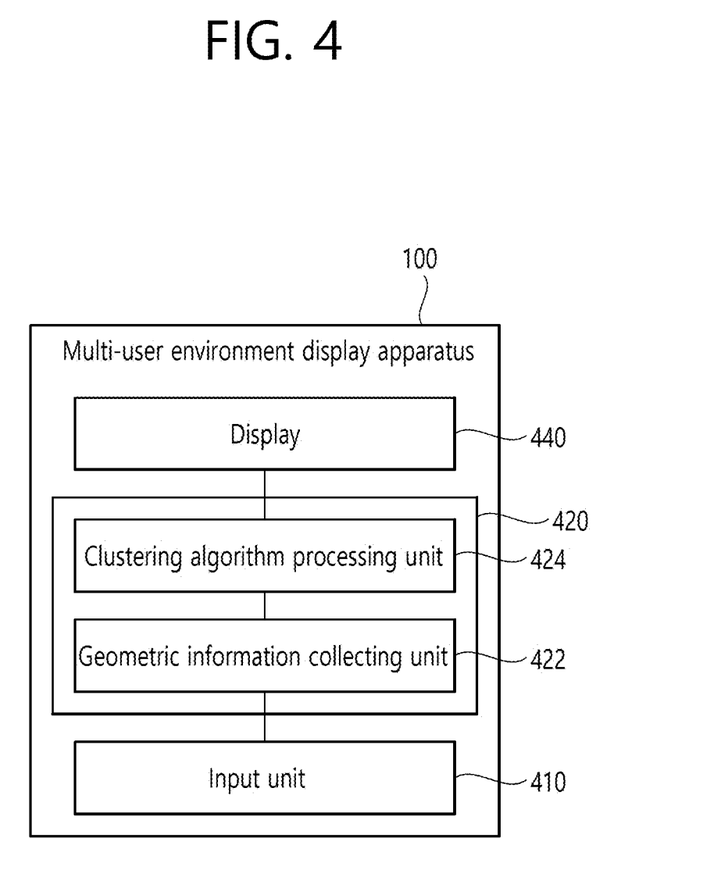
FIG. 4 illustrates a structure of a multi-user environment display apparatus performing a method for user-based application grouping in a multi-user environment according to a preferred embodiment of the present invention.

FIG. 4 illustrates a structure of a multi-user environment display apparatus performing a method for user-based application grouping in a multi-user environment according to a preferred embodiment of the present invention.

Referring to FIG. 4, a multi-user environment display apparatus 400 for implementing a method for user-based application grouping in a multi-user environment comprises an input unit 410, a grouping processing unit 420, and a display unit 440. The grouping processing unit 420 includes a geometric information collecting unit 422 and a clustering algorithm processing unit 424.

The input unit 410 performs the function for receiving inputs from a plurality of users in a multi-user environment. To recognize a plurality of users, wireless communication or a human body detecting sensor may be used to identify which user has accessed in a multi-user environment. Also, approach of a user may be detected by using biometric authentication of the user. The user may execute or operate the plurality of applications through a touch input to the input unit 410 in the multi-user environment.

The grouping processing unit 420 collects geometric information including coordinates of both endpoints 320a, 320b of a diagonal line and the rotation angle 340 of a bounding box 310 of a plurality of application windows of each user in a multi-user environment and applies a clustering algorithm by using the geometric information (which includes, for example, coordinates of both endpoints 320a, 320b of a diagonal line and the rotation angle 340 of the bounding box 310) of a plurality of applications of each user in a multi-user environment as a criterion for classifying the plurality of applications.

A plurality of applications of each user in a multi-user environment shares one input/output device to execute a plurality of applications. The geometric information collecting unit 422 may, for example, perform the function of a window manager which is system software managing the position and/or shape of a window of an application or a program in the GUI system. The window manager may perform the function for generating and deleting each window of the plurality of applications and for updating status information.

In other words, the geometric information collecting unit 422 collects, on the basis of the information received from the input unit 410, geometric information including coordinates of both endpoints 320a, 320b of an imaginary diagonal line and the rotation angle 340 of the bounding box 310 of a plurality of application windows for each user in a multi-user environment.

The clustering algorithm processing unit 424, on the basis of the geometric information including coordinates of both endpoints 320a, 320b of a diagonal line and the rotation angle 340 of the bounding box 310 of the plurality of application windows received from the geometric information collecting unit 422, applies a clustering algorithm to the plurality of applications and classifies the plurality of applications according to each user.

The display unit 440 displays an execution screen of a user-based application in a multi-user environment. Through the displayed screen, users may recognize the execution state of a plurality of applications and control the plurality of applications.

Figure 5:
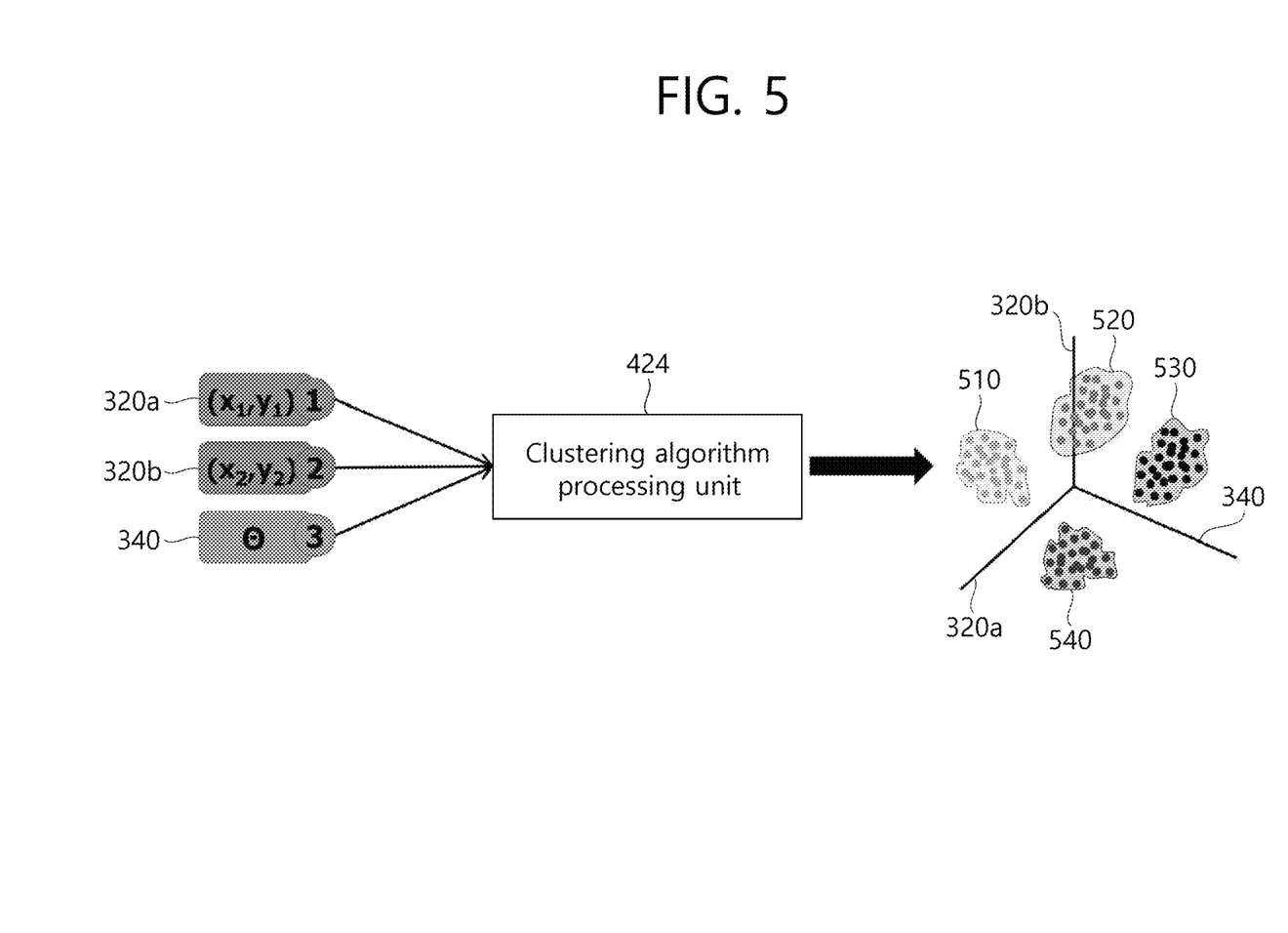
FIG. 5 illustrates a result of classification of coordinates of both endpoints of diagonal lines and rotation angles of bounding boxes of windows of a plurality of applications for each user in a table-top environment applying a clustering algorithm according to a preferred embodiment of the present invention.

FIG. 5 illustrates a result of classification of coordinates of both endpoints of diagonal lines and rotation angles of bounding boxes of windows of a plurality of applications for each user in a table-top environment applying a clustering algorithm according to a preferred embodiment of the present invention.

The clustering algorithm processing unit 424 takes the most similar K data from existing data and applies the K-Nearest Neighbor (K-NN) classifier machine learning algorithm which is a new data prediction method.

Referring to FIG. 5, the geometric information collecting unit 422 collects geometric information including coordinates 320a, 320b and rotation angles 340 of a plurality of applications for each user. The coordinates 320a, 320b may include the coordinate (x1, y1) 320a at the upper-left position of a bounding box 310 of a window of each of a plurality of applications and the coordinate (x2, y2) 320b at the lower-right position of the bounding box 310.

The clustering algorithm processing unit 424 applies the K-NN classifier machine learning algorithm to the coordinates 320a, 320b of both endpoints of diagonal lines of the bounding boxes 310 of a plurality of application windows for each user and the rotation angles 340 of the bounding boxes 310, analyzes geometric information patterns of the plurality of applications in a multi-user environment, and classifies the plurality of applications executed by each user.

Here, the clustering algorithm processing unit 424 may be implemented in a table-top display apparatus, for example. Or the clustering algorithm processing unit 424 may be implemented within an augmented reality HMD device such as augmented reality (AR) glass. Similarly, the clustering algorithm processing unit 424 may be implemented in a server external to the augmented reality HMD device—for example, a cloud server—to run a machine learning algorithm.

FIG. 5 illustrates a processing result of a clustering algorithm when four users execute a plurality of applications in a multi-user environment. In other words, FIG. 5 illustrates a result 510 of grouping coordinates 320a, 320b of both endpoints of diagonal lines of bounding boxes 310 of windows of a plurality of applications executed by a first user and rotation angles 340 of the bounding boxes; a result 520 of grouping coordinates 320a, 320b of both endpoints of diagonal lines of bounding boxes 310 of windows of a plurality of applications executed by a second user and rotation angles 340 of the bounding boxes; a result 530 of grouping coordinates 320a, 320b of both endpoints of diagonal lines of bounding boxes 310 of windows of a plurality of applications executed by a third user and rotation angles 340 of the bounding boxes; and a result 540 of grouping coordinates 320a, 320b of both endpoints of diagonal lines of bounding boxes 310 of windows of a plurality of applications executed by a fourth user and rotation angles 340 of the bounding boxes. As shown in FIG. 5, in a table-top display environment, when four users execute a plurality of their own applications at different positions of the upper, lower, left, and right side of a table-top display 100, by using a specific, common geometric feature (for example, positions of application windows are located within a predetermined radius from the corresponding user, or rotation angles of the application windows lie within a specific range from the user) among the applications executed by one particular user, applications may be grouped according to the geometric information found in the plurality of applications for each user.

The present invention may also be applied to the case where a plurality of users execute a plurality of applications, or a plurality of users perform their tasks by using 3D virtual objects in an augmented reality-based multi-user environment—for example, the augmented reality environment employing the Microsoft HoLoLens—by grouping applications for each user or grouping virtual objects related to the corresponding user.

In the case of a three-dimensional environment, objects may be grouped in two different ways depending on the performance of the corresponding apparatus (device).

First, in the case of a low performance apparatus (device), a two-dimensional bounding box is generated by using the two-dimensional visual shape of a 3D object, and which particular user is associated to which virtual objects in a 3D augmented environment may be figured out by adding geometric information such as angle and depth information to the bounding box.

Second, in the case of a high performance apparatus (device), a 3D object is modeled in the three dimensions by using two-dimensional projections visually appearing with respect to the corresponding object, and a 3D bounding box enclosing the 3D model is generated. And by adding geometric information of angle and depth to the generated 3D bounding box, a relationship of a user with respect to a plurality of virtual objects in a 3D augmented reality environment may be figured out with higher accuracy than when the 2D bounding box is used.

Figure 6:
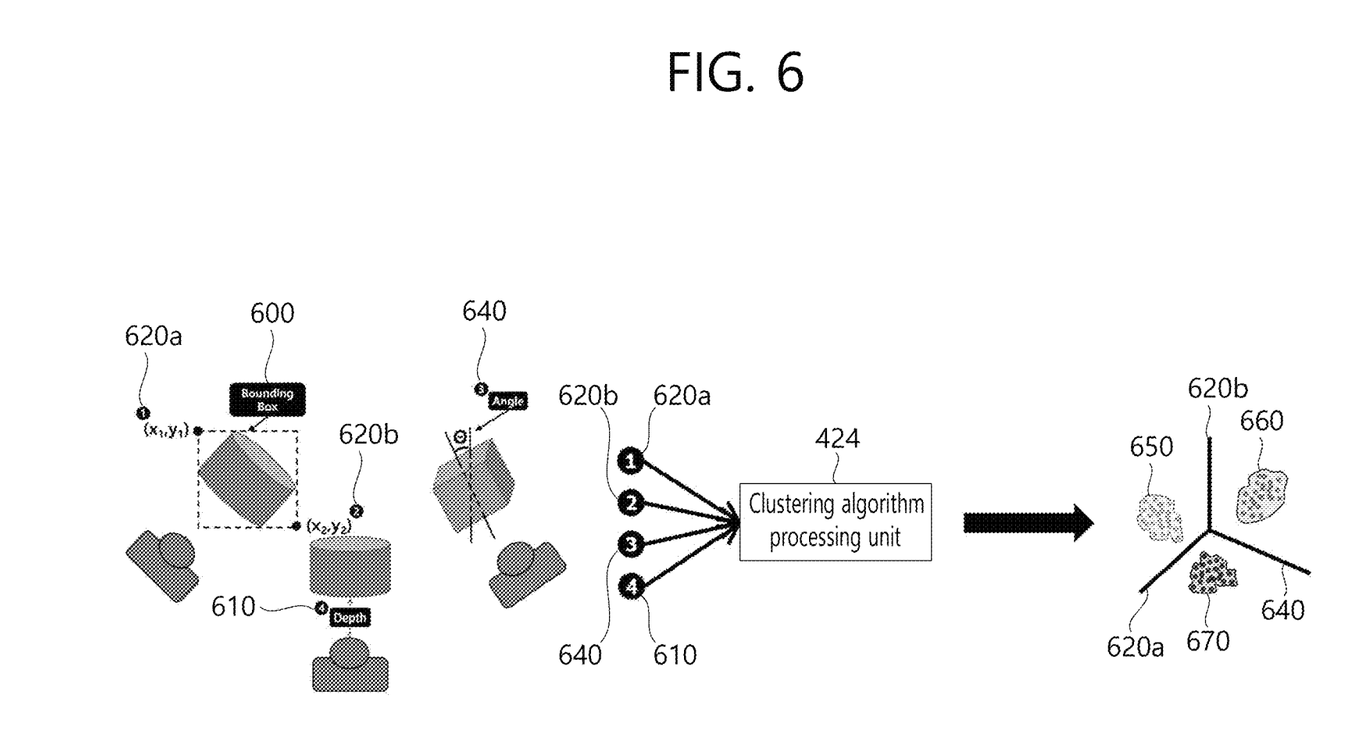
FIG. 6 illustrates a method for grouping multi-user based objects in an augmented reality environment according to a preferred embodiment of the present invention.

FIG. 6 illustrates a method for grouping multi-user based objects in an augmented reality environment according to a preferred embodiment of the present invention.

Through a method for multi-user based object grouping in the augmented reality environment, in the augmented reality or mixed reality environment employing the Microsoft HoLoLens, when a collaborative work (for example, robot design, automotive design, and surgical operation) is conducted among multi-users, virtual objects associated with a particular user may be grouped for each user. Compared with a method for multi-user based application grouping in a 2D environment, which particular user is associated to which virtual objects in a 3D augmented environment may be figured out by adding geometric information such the depth 610 and using the geometric information including coordinates 620a, 620b of both endpoints of a diagonal line, rotation angle 640, and depth 610 of a bounding box 600 enclosing the plurality of objects.

Referring to FIG. 6, a method for multi-user based object grouping in a 3D augmented reality environment collects geometric information of objects in the vicinity of each of a plurality of users in an augmented reality-based multi-user environment. The geometric information includes the coordinate (x1, y1) 620a at the upper-left position, coordinate (x2, y2) 620b at the lower-right position, rotation angle 640, and depth 610 of a bounding box 600 for each of the plurality of objects. Afterwards, based on the collected and extracted geometric information, the clustering algorithm processing unit 424 applies a clustering algorithm, and a plurality of objects are grouped for each user according to the result obtained from the clustering algorithm processing unit 424.

Referring to FIG. 6, in a method for multi-user based object grouping in a 3D augmented reality environment, shown are a grouping result of the coordinate (x1, y1) 620a at the upper-left position, coordinate (x2, y2) 620b at the lower-right position, rotation angle 640, and depth 610 information of a bounding box 600 of a plurality of objects located in the vicinity of a first user; a grouping result of the coordinate (x1, y1) 620a at the upper-left position, coordinate (x2, y2) 620b at the lower-right position, rotation angle 640, and depth 610 information of a bounding box 600 of a plurality of objects located in the vicinity of a second user; and a grouping result of the coordinate (x1, y1) 620a at the upper-left position, coordinate (x2, y2) 620b at the lower-right position, rotation angle 640, and depth 610 information of a bounding box 600 of a plurality of objects located in the vicinity of a third user.

As shown in FIG. 6, when four users perform their works by using a plurality of their own objects (or a plurality of applications) at different positions, one particular user may group user-specific objects (or applications) by using geometric information of the plurality of objects (or applications) based on the fact that objects in the vicinity of the particular user exhibit a specific, common geometric feature (for example, positions of objects (or applications) are located within a predetermined radius from the corresponding user, or rotation angles of the objects (or applications) lie within a specific range from the user).

For example, in the case of a low performance apparatus (device), a 2D bounding box is generated from the two-dimensional shape as shown visually with respect to a 3D virtual object, geometric information of angle and depth is added to the generated 2D bounding box, geometric information of the objects located in the vicinity of each of a plurality of users is collected in a 3D augmented reality-based multi-user environment, a plurality of objects are grouped for each user from the result obtained by applying a clustering algorithm on the basis of the collected and extracted geometric information, and thereby which particular user is associated with which virtual objects may be figured out. The geometric information may include the coordinate at the upper-left position, coordinate at the lower-right position, rotation angle, and depth information of the 2D bounding box.

For example, in the case of a high performance apparatus (device), a 3D virtual object is modeled in the three dimensions by using two dimensional projections visually appearing with respect to the 3D virtual object, and a 3D bounding box enclosing the 3D model is generated. Subsequently, geometric information of angle and depth is added to the generated 3D bounding box, geometric information of the objects located in the vicinity of each of a plurality of users is collected in a 3D augmented reality-based multi-user environment, a plurality of objects are grouped for each user from the result obtained by applying a clustering algorithm on the basis of the collected and extracted geometric information, and thereby which particular user is associated with which virtual objects may be figured out. The geometric information may include predetermined coordinates, rotation angle, and depth information of the 3D bounding box—for example, a cube or a rectangular box. Here, the predetermined coordinates when the 3D bounding box is a cube or a rectangular box may be the coordinates of three vertices which may specify the cube or rectangular box.

Figure 7:
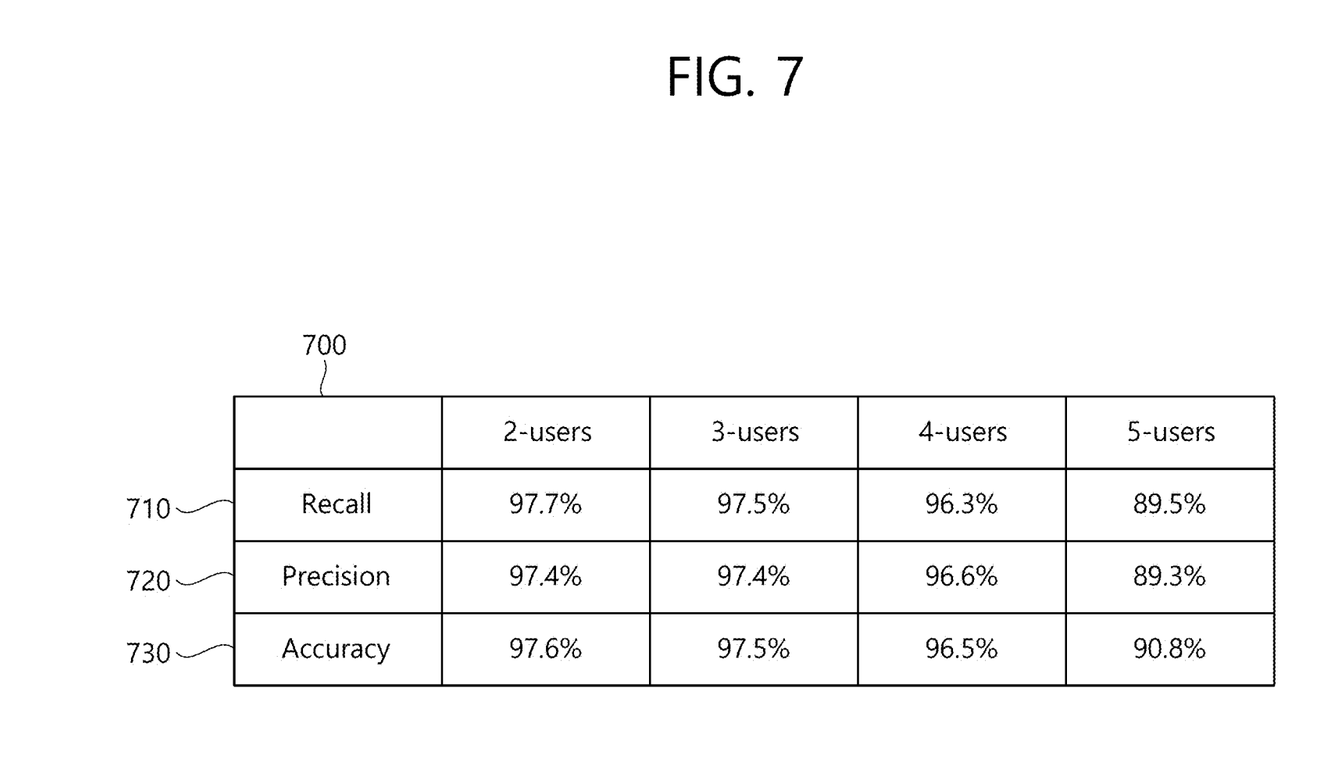
FIG. 7 is a table illustrating an experimental result of a method for multi-user based application grouping in a multi-user environment according to a preferred embodiment of the present invention.

FIG. 7 is a table illustrating an experimental result of a method for multi-user based application grouping in a multi-user environment according to a preferred embodiment of the present invention.

Referring to FIG. 7, it is assumed that each user in a table-top multi-user environment executes two to five applications. First, the two to five applications are executed freely for each environment, and the window manager tracks the geometric information of the applications every two seconds. The geometric information includes coordinates of both endpoints of a diagonal line and rotation angle (θ) information of a bounding box of a plurality of application windows. Afterwards, users are classified according to the geometric information.

Referring to FIG. 7, in the environment where the two to five applications are grouped for four or less users, all of the recall 710, precision 720, and accuracy 730 performance is higher than 96%. Regarding the method for grouping the two to five applications, in the environment where there are five users, since at least two users are located along the same edge of a multi-user environment table-top display, the geometric information of applications of the two users has similar characteristics to each other, and accuracy tends to be degraded. However, even in this case, accuracy of about 90% or more is obtained.

According to methods for user-based application or object grouping in a multi-user environment according to the example embodiments of the present invention and a table-top display apparatus using the method, applications currently executed in a table-top apparatus are grouped for each user. Through the application grouping for each user, a user-specific special function such as a user-specific application history may be provided. For example, a list of applications that an individual user has recently executed may be displayed for the user, or applications may be managed more reliably in a table-top environment through a system resource management function such as a central processing unit (CPU), memory, or input/output systems (I/Os).

What is claimed is:

1. A processor-implemented method for user-based application grouping, comprising:
    collecting geometric information of each window of a plurality of applications displayed on a table-top display, wherein the geometric information of each window is different and is based on respective positions at which users use the table-top display;
    classifying the plurality of applications for each of the users by using a clustering algorithm, wherein the clustering algorithm uses the collected geometric information as classification criterion; and
    grouping the applications for each of the users on the table-top display based on a result of the classifying of the plurality of applications such that each of the applications is associated with a user among the users,
    wherein the geometric information comprises
    a first coordinate at a first end of an imaginary diagonal line of a bounding box of windows of applications, among the plurality of applications, executed by a user, among the users,
    a second coordinate at a second end of the imaginary diagonal line, and
    a rotational angle of the bounding box, and the grouping of the applications comprises grouping the applications based on the first coordinate, the second coordinate, and the rotational angle such that, when the first coordinate and the second coordinate lie within a predetermined radius from the user or the rotational angle lies within a predetermined angular range with respect to the user, the windows are grouped to be associated with the user.

2. The method of claim 1, wherein the geometric information includes a rotation angle and first and second coordinates,
    wherein the first and second coordinates are located at both endpoints of an imaginary diagonal line of a bounding box enclosing each window, the first coordinate is located at a first endpoint of the imaginary diagonal line, and the second coordinate is located at a second endpoint opposite the first endpoint, and
    wherein the rotation angle represents an angle at which a corresponding application window is inclined with respect to an imaginary reference line.

3. The method of claim 2, wherein a clustering algorithm processing unit receives the geometric information, analyzes a pattern of the geometric information according to characteristics of the respective positions by using a K-Nearest Neighbor (K-NN) classifier machine learning algorithm, and classifies the plurality of applications for each of the users.

4. The method of claim 1, further comprising showing a history of the classified plurality of applications, wherein the history includes a list of at least one recently executed applications for each of the users.

5. The method of claim 1, wherein a system resource is managed by using the classified plurality of applications, wherein the system resource corresponds to any one or any combination of any two or more of a central processing unit (CPU), a memory, and an input/output system.

6. The method of claim 1, wherein the collecting of the geometric information is performed by a geometric information collecting unit, and the geometric information collecting unit performs either one or both of functions for generating and deleting each window of the plurality of applications and functions for updating status information.

7. The method of claim 6, wherein the geometric information collecting unit includes a window manager, which is system software for managing positions and shapes of windows of applications or programs in a graphical user interface (GUI) system.

8. The method of claim 1, wherein
    first endpoints of a first imaginary diagonal line of a first bounding box of first windows of the plurality of applications and a first rotation angle of the first bounding box conform with a predetermined first pattern having a value within a first predetermined range,
    second endpoints of a second imaginary diagonal line of a second bounding box of second windows of the plurality of applications and a second rotation angle of the second bounding box conform with a predetermined second pattern having a value within a second predetermined range,
    the first bounding box bounds applications, among the plurality of applications, used by a first user among the users, and
    the second bounding box bounds applications, among the plurality of applications, used by a second user among the users.

9. The method of claim 8, wherein
    the first endpoints include first coordinates at a first corner of the first bounding box and second coordinates at a second corner of the first bounding box opposite to the first corner, and
    the second endpoints include third coordinates at a third corner of the second bounding box and fourth coordinates at a fourth corner of the second bounding box opposite to the third corner.

10. An apparatus for user-based application grouping, comprising:
    one or more processors configured to:
    collect geometric information of each window of a plurality of applications displayed on a table-top display, wherein the geometric information of each window is different and is based on respective positions at which users use the table-top display; and
    classify the geometric information of each window for each of the users by applying a clustering algorithm, wherein the clustering algorithm uses the collected geometric information as classification criterion, and
    wherein the applications are grouped for each of the users on the table-top display based on a result of the classification of the plurality of applications such that each of the applications is associated with a user among the users,
    wherein the geometric information comprises
    a first coordinate at a first end of an imaginary diagonal line of a bounding box of windows of applications, among the plurality of applications, executed by a user, among the users,
    a second coordinate at a second end of the imaginary diagonal line, and
    a rotational angle of the bounding box, and the grouping of the applications comprises grouping the applications based on the first coordinate, the second coordinate, and the rotational angle such that, when the first coordinate and the second coordinate lie within a predetermined radius from the user or the rotational angle lies within a predetermined angular range with respect to the user, the windows are grouped to be associated with the user.

11. The apparatus of claim 10, wherein the geometric information includes a rotation angle and first and second coordinates, wherein the first and second coordinates are located at both endpoints of an imaginary diagonal line of a bounding box enclosing each window, the first coordinate is located at a first endpoint of the imaginary diagonal line, and the second coordinate is located at a second endpoint opposite the first endpoint, and wherein the rotation angle represents an angle at which a corresponding application window is inclined with respect to an imaginary reference line.

12. The apparatus of claim 11, wherein the one or more processors are further configured to receive the geometric information, analyze a pattern of the geometric information according to characteristics of the respective positions by using a K-Nearest Neighbor (K-NN) classifier machine learning algorithm, and classify the plurality of applications for each of the users.

13. The apparatus of claim 10, wherein a function is provided for showing a history of the classified plurality of applications, and the history includes a list including at least one recently executed application for each of the users.

14. A processor-implemented method for user-based application grouping, comprising:

collecting geometric information of each of a plurality of displayed applications, wherein the geometric information of each of the plurality of applications is different for each user among users;

classifying the plurality of applications for each of the users by using a clustering algorithm, wherein the clustering algorithm uses the collected geometric information as classification criterion; and grouping the applications for each of the users on a display based on a result of the classifying of the plurality of applications such that each of the applications is associated with a user among the users, wherein the geometric information comprises a first coordinate at a first end of an imaginary diagonal line of a bounding box of windows of applications, among the plurality of applications, executed by a user, among the users, a second coordinate at a second end of the imaginary diagonal line, and a rotational angle of the bounding box, and the grouping of the applications comprises grouping the applications based on the first coordinate, the second coordinate, and the rotational angle such that, when the first coordinate and the second coordinate lie within a predetermined radius from the user or the rotational angle lies within a predetermined angular range with respect to the user, the windows are grouped to be associated with the user.

15. The method of claim 14, wherein the geometric information is different for each window of the plurality of applications according to respective positions at which each of the users uses the display.

16. The method of claim 14, wherein the geometric information includes a rotation angle and first and second coordinates, wherein the first and second coordinates are located at both endpoints of an imaginary diagonal line of a bounding box enclosing each window, the first coordinate is located at a first endpoint of the imaginary diagonal line, and the second coordinate is located at a second endpoint opposite the first endpoint, and wherein the rotation angle represents an angle at which a corresponding application window is inclined with respect to an imaginary reference line of the bounding box.

17. The method of claim 16, wherein the classifying of the plurality of applications comprises receiving the geometric information, and analyzing a pattern of the geometric information according to characteristics of the respective positions by using a K-Nearest Neighbor (K-NN) classifier machine learning algorithm.

18. The method of claim 14, further comprising showing a history of the classified plurality of applications, wherein the history includes a list including at least one recently executed applications for each of the users.

19. A processor-implemented method for user-based object grouping, comprising:

collecting geometric information of each of a plurality of displayed objects, wherein the geometric information of each of the plurality of objects is different for each user among users;

classifying the plurality of objects for each of the users by using a clustering algorithm, wherein the clustering algorithm uses the collected geometric information as classification criterion; and grouping the applications for each of the users on an augmented-reality display based on a result of the classifying of the plurality of objects such that each of the applications is associated with a user among the users, wherein the geometric information comprises a first coordinate at a first end of an imaginary diagonal line of a bounding box of windows of applications, among the plurality of applications, executed by a user, among the users, a second coordinate at a second end of the imaginary diagonal line, and a rotational angle of the bounding box, and the grouping of the applications comprises grouping the applications based on the first coordinate, the second coordinate, and the rotational angle such that, when the first coordinate and the second coordinate lie within a predetermined radius from the user or the rotational angle lies within a predetermined angular range with respect to the user, the windows are grouped to be associated with the user.

20. The method of claim 19, wherein the geometric information includes depth information of the plurality of objects, a rotation angle, and first and second coordinates, wherein the first and second coordinates are located at both endpoints of an imaginary diagonal line of a bounding box enclosing each of the plurality of objects, the first coordinate is located at a first endpoint of the imaginary diagonal line, and the second coordinate is located at a second endpoint opposite the first endpoint, and wherein the rotation angle represents an angle at which a corresponding object is inclined with respect to an imaginary reference line of the bounding box.

21. The method of 20, wherein the classifying of the plurality of objects comprises receiving the geometric information, and analyzing a pattern of the geometric information according to characteristics of each of the users by using a K-Nearest Neighbor (K-NN) classifier machine learning algorithm.

22. The method of claim 19, wherein the collecting of the geometric information comprises modeling the plurality of objects so that the plurality of objects visually appear as two-dimensional projections into a three-dimensional model, and generating a three-dimensional bounding box enclosing the three-dimensional model, the geometric information includes information of angle and depth of the three-dimensional bounding box, the angle represents an angle at which a corresponding object is inclined with reference to an imaginary reference line of the bounding box, and the depth represents a depth of the corresponding object.

23. A non-transitory computer-readable medium storing instructions that, when executed by a processor, cause the processor to perform the method of claim 1.

* * * * *